Nov. 8, 1932.  J. N. MAHONEY  1,887,318
FOLLOW-UP SYSTEM FOR GYROCOMPASSES
Filed Jan. 3, 1929
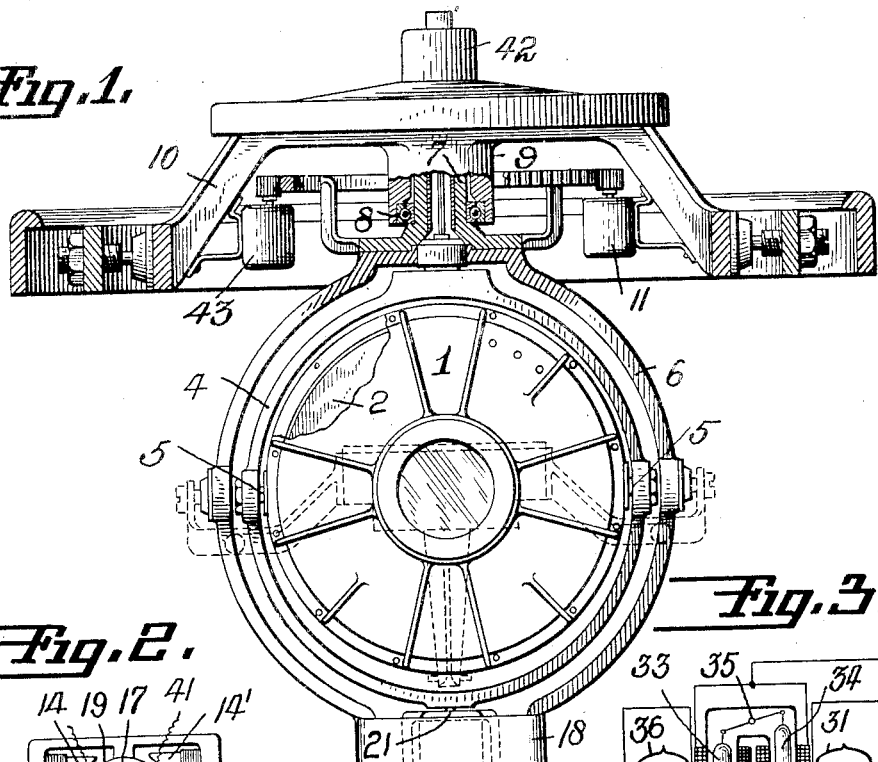
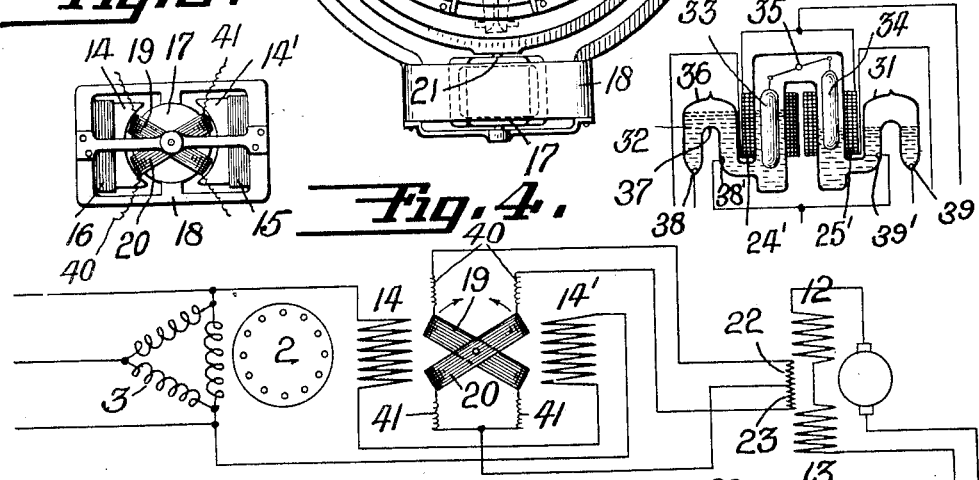
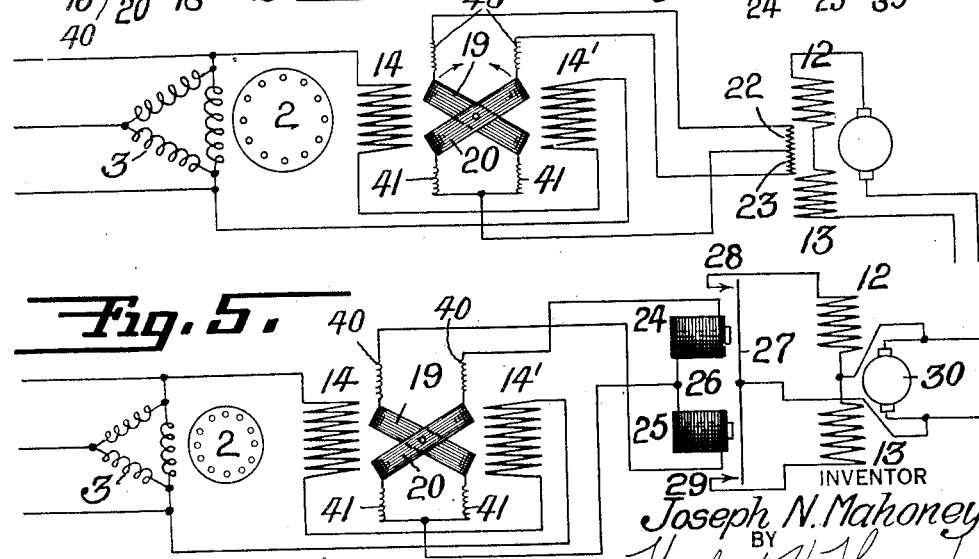
INVENTOR
Joseph N. Mahoney
BY
Herbert H. Thompson
his ATTORNEY.

Patented Nov. 8, 1932

1,887,318

UNITED STATES PATENT OFFICE

JOSEPH N. MAHONEY, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

FOLLOW-UP SYSTEM FOR GYROCOMPASSES

Application filed January 3, 1929. Serial No. 330,114.

This invention relates to means for actuating the follow-up systems of gyro-compasses and other sensitive instruments. In this type of instrument a power driven follow-up system is used to actuate the transmitter for transmitting the readings of the compass to a distance. In the Sperry compass the follow-up system also serves as a support for the sensitive element so as to reduce friction about the vertical axis. In the past the practice has been to drive the follow-up system from contacts located on the sensitive and follow-up elements so that upon relative displacement between the two, electric circuits were changed to actuate the follow-up motor. I am aware that it has been proposed to vary balanced resistances upon relative change in the positions of the sensitive and follow-up elements whereby the balance of the receiving circuit was disturbed and the follow-up motor actuated. In the system referred to, the sensitive element was floated in an electrolyte within the follow-up element and relative displacement varied the length of the path of current flow. All such systems, however, require actual physical contact for actuation and thereby introduce an appreciable amount of friction and, in addition, any system involving contacts is liable to break down without notice in case the contact should become fouled so as to interfere with the flow of current. In my present invention I avoid the use of any contact between the sensitive and follow-up elements and employ a non-contacting, non-torque applying or mere influence linkage as an actuator between such elements for actuating the follow-up motor. To this end I employ a transformer type of transmitter which, however, does not depend upon a change in the magnetic flux and, therefore, the magnetic pull in the circuit which would be caused by any change in length or area of the magnetic air gap. On the other hand I employ a constant air gap type of transformer in which actuating currents are produced by a slight redistribution of the flux through balanced coils, the induced current being kept to such a minimum as to reduce the torque between the elements to a negligible quantity.

Referring to the drawing in which several preferred forms of the invention are shown;

Fig. 1 shows the elements of a standard form of compass with my follow-up system mounted thereon.

Fig. 2 is a bottom plan view of the actuator.

Fig. 3 is a detail of the preferred form of relay for use in connection with the form of invention shown in Fig. 5.

Fig. 4 shows a wiring diagram of the form of the invention which avoids the use of relays as an extra element of the system.

Fig. 5 shows a form of the invention in which a power amplifying relay may be employed.

It is practically the universal practice to drive the gyro-wheels of gyro-compasses with polyphase alternating current and I propose to make use of the same supply for actuating the follow-up system. I have chosen the Sperry form of compass to illustrate one application of my invention, but it will be understood that the invention is applicable to any form of compass or other instrument of this nature. In this form of compass the sensitive element proper comprises the gyro casing 1 which encloses the rotor 2 electrically spun by a suitable polyphase induction winding 3, and the vertical ring 4 within which the casing 1 is supported on horizontal trunnions 5. The follow-up element comprises the phantom ring 6 surrounding the vertical ring together with the vertical stem 7 rising therefrom from which the sensitive element is suspended and journaled for limited movement about its vertical axis. The follow-up system is journaled for complete rotation about the vertical axis in bearings 8 within a hub 9 on the spider 10. The follow-up element is shown as rotated from suitable reversible motive means 11, which may comprise a reversible motor with opposed field windings 12 and 13. Coarse and fine self-synchronous transmitters 42 and 43 may be driven directly from the follow-up element.

My invention particularly concerns the system of operating the motor without contacts on the sensitive element. As shown, I mount on the follow-up element one or more pole pieces 14 and 14' having windings 15 and 16 through which alternating current from one or more phases of the compass supply is caused to flow. Preferably, I provide a fixed magnetic path for the lines of force between the poles which may comprise a soft iron core 17 fixed in the frame 18. Between said core, however, and the poles I rotatably mount inductive means such as one or more coils or open loops of wire 19—20 which are connected to the stem 21 of the vertical ring 4 so as to rotate therewith. While, therefore, lines of force between the poles pass through the coils, the magnetic gap and therefore the flux density are not changed. In addition, for small movements of the coils with resultant small current differentials very little change in flux distribution is produced. The coils are preferably oppositely wound and are normally positioned at equal angles from the central vertical plane of the compass so that each coil has generated therein, by a transformer action, an equal and opposite potential. When, however, slight displacement takes place between the sensitive and follow-up elements the position of the coils is changed slightly, the induced current in one coil being slightly increased and the other slightly decreased. This at once causes current flow in one direction or the other through the external circuit dependent on which coil is including the greater flux.

This circuit includes loose lead-in coils 40 and 41 of light wire which impose no torque on the coils 19 and 20 and may control directly or indirectly the follow-up motor. As shown in Fig. 4 the motor fields are excited from the main A. C. supply but additional auxiliary windings 22 and 23 in circuit with coils 19 and 20 are placed thereon which by the structural and phase relationships cause a distribution of the magnetic flux in such a manner as to cause a change in the direction of rotation of the armature whenever the current passing through the external circuit containing the windings 22—23 is reversed.

If desired, I may employ a power amplifying relay between the transmitter and the motive means or motor. As shown in Fig. 5, the windings 19—20 are connected to the opposed electromagnets 24—25 of the relay 26, so that the magnet which is receiving the most current pulls down the armature 27 on that side and closes the contact 28—29 to send current through the field in one direction or the other, the armature 30 in this case being supplied continuously with current from the main supply.

In Fig. 3 I show a form of relay which avoids the use of making and breaking contacts in the open air and the life of which is practically indefinite. In this form, a tube 31 composed of a series of reverse bends is partially filled with mercury 32 or other conducting fluid and is sealed. Within the tube is pivotally mounted a pair of magnetic cores 33—34, said cores being shown as pivoted at 35. Around the portions of the tubes containing the cores are placed balanced coils 24—25 which are placed in circuit with the windings 19—20. When, therefore, the winding 24', for instance, is stronger than the winding 25', the core 33 is depressed, raising the level of the mercury within the inverted U 36 so that it overflows over the hill or high spot 37 to complete the circuit between point 38 and 38'. If, on the other hand, the opposite coil 25' is the stronger, the circuit is completed between point 39 and 39' in a similar manner. This form of relay may be either of the constantly reversing that is, the hunting type or the dead beat type, depending upon whether the amount of mercury placed in the tubes is insufficient or sufficient to close both circuits, when the relay is centralized. The former is desirable, if the follow-up system is used as a support for the compass, as it keeps all bearings free.

Having described my invention, what I claim and desire to secure by Letters Patent is:

In a follow-up system for gyro-compasses and the like having a sensitive and follow-up element, an actuator comprising a variable transformer having the primary winding thereof mounted on the follow-up element, means for supplying the same with alternating current, a magnetic core fixed to said element and forming a stationary path for the magnetic lines of force, a pair of opposed coils mounted on said sensitive element in the path of said lines of force, and means differentially actuated therefrom for driving the follow-up system in either direction to maintain the same in a predetermined relation to the sensitive element.

In testimony whereof I have affixed my signature.

JOSEPH N. MAHONEY.